United States Patent [19]

Salyers

[11] Patent Number: 4,474,513
[45] Date of Patent: Oct. 2, 1984

[54] PORTABLE HANDHELD DEVICE FOR FORMING ALIGNED HOLES

[76] Inventor: James F. Salyers, 1433 Sevier Terrace Dr., Kingsport, Tenn. 37660

[21] Appl. No.: 270,490

[22] Filed: Jun. 4, 1981

[51] Int. Cl.³ .............................................. B23B 45/14
[52] U.S. Cl. ................................... 408/110; 408/146; 408/204; 408/705; 408/226
[58] Field of Search ............... 408/72, 72 B, 110, 113, 408/114, 146, 212, 241 G, 703, 705, 239, 239 A, 238, 240, 203, 204, 203.5, 205, 226; 144/104, 108, 23; 279/76, 77, 78, 86, 97, 101; 403/108, 329, 378, 379; 248/354 P, 407; 384/226, 429, 250, 288, 442, 443

[56] References Cited

U.S. PATENT DOCUMENTS

| 715,448 | 12/1902 | Wilson, Jr. | 384/443 |
| 921,644 | 5/1909 | Forster | 408/238 |
| 939,900 | 11/1909 | Forster | 408/238 |
| 2,448,369 | 8/1948 | Heintz et al. | 384/429 |
| 2,721,592 | 10/1955 | Baker | 144/23 |
| 2,812,791 | 11/1957 | Mackey | 408/212 |
| 3,011,369 | 11/1960 | Russell | 408/72 |
| 3,138,183 | 6/1964 | Stewart | 144/20 |
| 3,865,502 | 2/1975 | Hamann | 408/238 |
| 3,884,593 | 5/1975 | Christoffer | 408/16 |
| 4,076,444 | 2/1978 | Siebrecht | 408/238 |

Primary Examiner—Z. R. Bilinsky
Assistant Examiner—Thomas M. Kline
Attorney, Agent, or Firm—Malcolm G. Dunn

[57] ABSTRACT

Portable handheld device for electricians, plumbers and builders to use to form in one operation perfectly aligned, craftsman-like holes through a soffit and a roof above, or through a ceiling and a roof above, through which aligned holes an electrical conduit, soil stack or vent pipe, chimney pipe, or the like, may be installed.

7 Claims, 5 Drawing Figures

PORTABLE HANDHELD DEVICE FOR FORMING ALIGNED HOLES

BACKGROUND OF THE INVENTION

The present invention is directed to a portable handheld device by which electricians, plumbers and builders may form in one operation perfectly aligned, craftsman-like holes through a soffit and a sloping roof, or through a ceiling and a roof, and through which aligned holes an electrical conduit, soil stack or vent pipe, chimney pipe, or the like, may be installed.

In the case of an electrical conduit, for instance, such conduit usually extends up the outside of a house, passes through the soffit (the horizontal underportion of a roof that projects outwardly beyond the wall of a house or building) and then through the roof to extend a predetermined height above the roof (according to local electrical codes). Electrical cables from the outdoor electrical power pole or electrical transformer may then be passed through the installed electrical conduit for subsequent connection to a utility meter base or meter and then into the house for connection to a fuse box or circuit breaker.

A soil stack or vent pipe may extend upwardly along an interior wall and project above the roof for a short distance (according to local building codes).

There are several typical procedures an electrician normally follows to form as nearly as possible aligned holes through a soffit and the roof above so that he can install an electrical conduit therethrough. He may use either a hole saw or keyhole saw to cut a hole through the underside of the horizontal portion of the soffit. The hole has to be spaced in such manner that the installed electrical conduit will be about ⅝ to about ¾ inch away from the wall of the house in order to line up with the hub and opening in the later installed utility meter base. The hole has to be made large enough to accommodate the particular external diameter of the electrical conduit. Then the electrician or his helper goes up on the roof and measures from the edge of the roof up the slope of the roof to the spot which he estimates will be directly above the hole made in the soffit. He may use a keyhole saw to cut a hole through the roof, sighting through the hole made in the roof to see if it is aligned with the hole in the soffit, and then he enlarges the hole as necessary to fit the outer diameter of the conduit. If he should cut the hole too large, then wedges must be inserted around the later installed conduit to hold it firmly in place. Alternatively, instead of measuring from the roof edge up the slope of the roof, the electrician may extend a wood auger up through the hole in the soffit to drill a pilot hole through the underside of the roof, provided the distance between the soffit and the roof is not too great for the wood auger. Then the electrician or his helper goes up on the roof and enlarges the pilot hole to accommodate the later installed electrical conduit. Sometimes the electrician may unexpectedly run into a two-by-four board to which the inner end of the soffit is secured. Then, he has to take a hammer and wood chisel and cut sufficiently through the obstructing board to allow the electrical conduit to be extended upwardly through the hole in the soffit, past the board, and through the hole in the roof. This entire procedure can be quite time consuming and might easily take two hours. If the holes that are formed should be out of alignment with the utility meter base because the electrician knew where the board was located and tried to avoid it, then the electrical conduit has to be bent to fit. This may require the use of a hydraulic bender or the like. Again, this requires much time to complete the job.

Once the electrical conduit is installed, then a roof flange of metal or neoprene or the like must be installed around the electrical conduit where it projects through the roof so that rain and weather cannot pass through the hole made in the roof for the electrical conduit. Similar problems can occur when making suitable sized holes for soil stacks or vent pipes, chimney pipes, and the like.

The use of the present invention enables one person in a few minutes and standing on the ground to form both the hole in the soffit and the hole through the roof in such manner that not only will the holes be perfectly aligned but also the holes will be perfectly sized and spaced from the house or building wall to fit the particular sized electrical conduit that will be installed. In this manner a craftsman-like appearance will result. The electrician may make up the wires in the electrical conduit, and then from his position on the ground, he may extend the conduit through both holes. If, in making the aligned holes, he should run into the board holding the inner end of the soffit, he may readily cut through in such manner that will not necessitate bending of the conduit so that it will line up with the two holes as well as the utility meter base. He may then ascend to the roof, make suitable wire connections and install a weatherhead at the end of the conduit to prevent water from entering.

An object of the invention, therefore, is to facilitate the formation of perfectly aligned and craftsman-like holes through and between one or more ceilings and the roof above of a house or building, or through and between a soffit and the roof above of a house or building, in preparation for subsequent installation of electrical conduits, soil stacks or vent pipes, chimney pipes, and the like.

Other objects of the invention will become apparent to those skilled in the art to which this invention pertains from the description which follows:

SUMMARY OF THE INVENTION

The invention is thus directed to a portable, handheld device comprising a rotatable cylindrical column of predetermined length for supporting at one end a hole saw or the like, for being driven in rotation at the other end by a suitable drive arrangement, and for being temporarily and releasably secured at two or more locations along its length by conduit clamps or the like which are fastened to a building wall or house wall in spaced predetermined alignment. The rotatable cylindrical column has at its one end an arrangement for receiving and being connected to the aforementioned hole saw or the like, and has at its other end a connection for being drivably engaged by the aforementioned drive arrangement. Two or more annular spacing collars encircle the outer surface of the rotatable column in close slidable and rotatable relation, and are slidably adjustably spaced along the length of the rotatable column for positioning at the aforementioned two or more locations. The annular spacing collars are adapted to be temporarily and releasably clamped at the aforementioned locations by the conduit clamps or the like.

The annular spacing collars have a predetermined diameter and are thereby adapted in cooperation with the aforementioned conduit clamps or the like to space the rotatable column a predetermined distance from a building or house wall.

Each of the annular spacing collars may have a pair of spaced radially extending annular flanges adapted to receive therebetween one of the aforementioned conduit clamps or the like in temporary clamped relation.

The portable handheld rotatable cylindrical column may be extendable in length and may comprise a tubular member having therebetween an extension member adapted to be slidably extended from and relative to the tubular member to different predetermined lengths. The extension member and tubular member may have a cooperating locking arrangement adapted to lock the extension member to the tubular member at the different extended predetermined lengths. The extension member has at its outer free end the aforementioned arrangement for receiving and being connected to the aforementioned hole saw or the like.

The cooperating locking arrangement includes a positioning pin connected to the tubular member. The extension member defines in its surface along its length a series of spaced holes within one of which the positioning pin is adapted to be engaged. An arrangement is provided for urging the extension member toward the positioning pin to retain the positioning pin in one of the series of spaced holes.

The extension member has at its inner end a guide arrangement adapted to space the inner end of the extension member from the tubular member and to slidably engage within the tubular member and against the interior surface of the tubular member.

The guide arrangement for the inner end of the extension member may comprise an annular disk.

The arrangement provided for urging the extension member toward the positioning pin may comprise a tension spring connected at its one end to the tubular member and having a portion of its free end engaging against the extension member.

DESCRIPTION OF THE PREFERRED EMBODIMENTS

Figure 1:
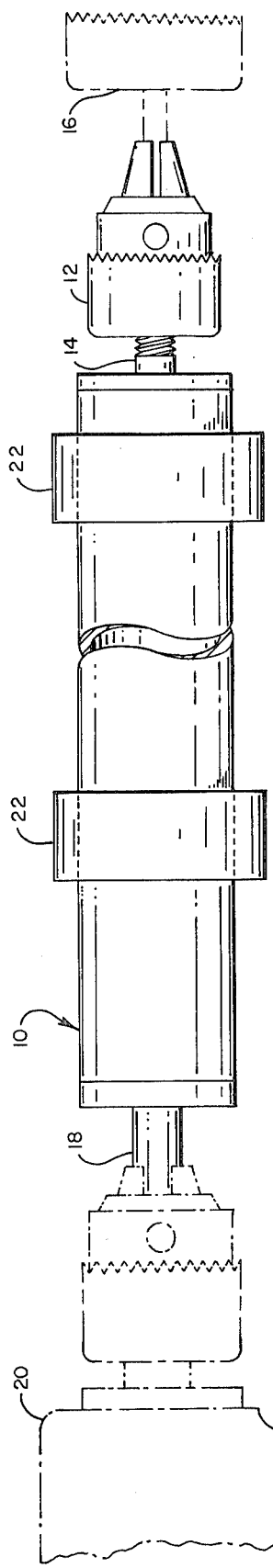
FIG. 1 is an elevational view, partially broken away and partially in cross-section, of the rotatable cylindrical column, and in phantom line illustrates how a hole saw or the like may be connected to one end thereof and how an electric drill may be connected at the other end thereof.

In reference to FIG. 1 of the drawings, the portable, handheld device or rotatable cylindrical column is shown at 10 and may be of any suitable length, such as eight or ten feet in length or whatever is deemed practical for the typical jobs that will be handled by it. A standard chuck 12 may be connected to a threaded bolt 14 at one end so that a hole saw 16 or the like may be received and connected. A tang or shaft 18 may be provided at the opposite end of the rotatable cylindrical column so that a suitable drive arrangement, such as an electric drill 20 or the like, may drivably engage it. At least two annular spacing collars 22 encircle the outer surface of the rotatable cylindrical column, and are fitted so as to have a close slidable and rotatable relation with the cylindrical column 10 and may be slidably adjustably spaced along the length of the rotatable cylindrical column. The annular spacing collars are adapted to be temporarily and releasably clamped by conduit clamps or the like (See FIG. 5), and to be slidably positioned along the length of the rotatable cylindrical column to the respective locations of the conduit clamps or the like. Additional annular spacing collars may be provided, as may be deemed necessary, but generally two such annular spacing collars will serve to align the rotatable cylindrical column in the desired operating position, such as a vertical position for formation of two or more holes in direct vertical alignment with each other in the manner shown.

The annular spacing collars 22 may also have a predetermined outer diameter so that in cooperation with the conduit clamps (See FIG. 5) or conduit straps, the rotatable cylindrical column will be appropriately spaced a predetermined distance from a building or house wall when temporarily and releasably clamped in preparation for forming the aforementioned aligned holes through a soffit and roof or through ceiling and roof. The annular spacing collars also enable the rotatable cylindrical column to be rotated relative to the collars when the annular spacing collars are temporarily clamped in the manner illustrated.

Figure 2:
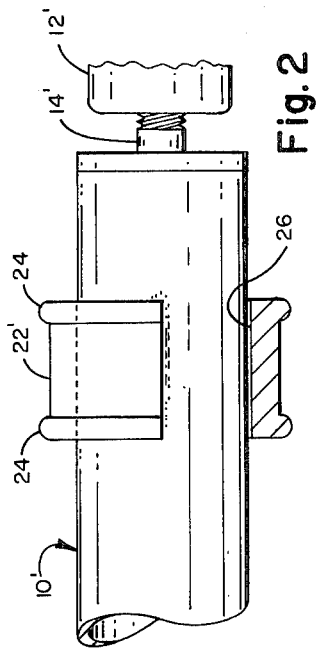
FIG. 2 is a fractional elevational view of the rotatable cylindrical column, and illustrates a modification of one of the annular spacing collars with its radially extending flanges.

In reference to FIG. 2, the rotatable cylindrical column is shown at 10' and a modified annular spacing collar 22' is shown as having a pair of spaced radially extending annular flanges 24. A conduit clamp (see FIG. 5) or the like may readily be received therearound the annular spacing collar between the pair of annular flanges. In this manner the annular spacing collar 22' may be less likely to slip free from the conduit clamp or the like before intended, in the event that the conduit clamp or the like had not been properly secured. FIG. 2 also shows that the inner diameter or bore 26 is such as to fit closely to the outer cylindrical surface of the rotatable cylindrical column 10'.

Figure 3:
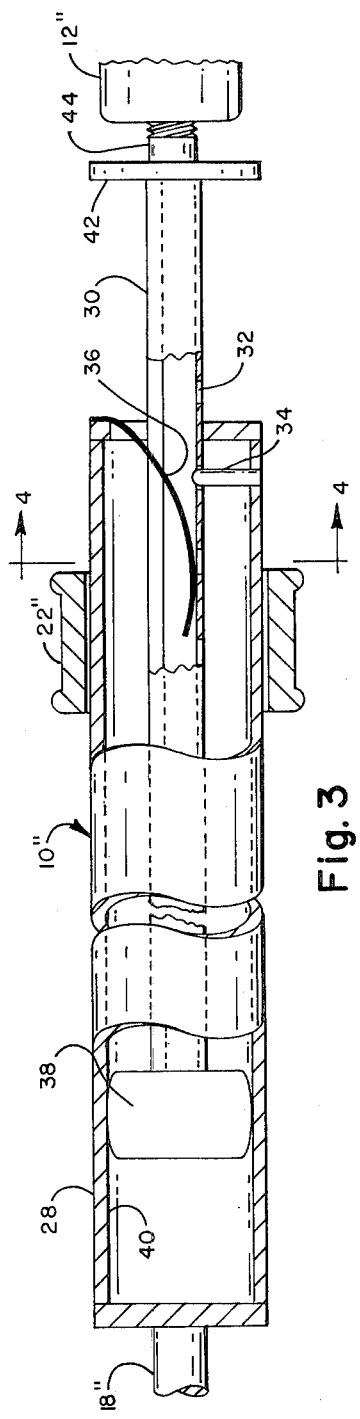
FIG. 3 is a fractional view in cross-section illustrating a modified rotatable column with an extension member and a locking arrangement.

In reference to FIG. 3, a further modification is shown by which the portable handheld device or rotatable cylindrical column 10" may be extendable in length. The rotatable cylindrical column comprises a tubular member 28, which has therewithin an extension member 30 that is adapted to be slidably extended from and relative to the tubular member 28. The extension member 30 may be provided with a series of spaced holes 32 formed within its surface and along its length. A positioning pin 34 may be connected to the tubular member 28 at one end thereof and is adapted to be engaged within one of the series of spaced holes 32 so that the extension member may be locked at any desired different predetermined length relative to the tubular member 28. The extension member 30 is urged toward the positioning pin 34 by a tension spring 36 so that the pin may be retained in whatever hole 32 desired. To release the positioning pin so as to change to a different hole, the operator merely forces the extension member 30 away from the positioning pin and against the bias of the tension spring 36. He then slides the extension member to the desired position relative to its tubular member, after which he allows the positioning pin to be urged by the tension spring to become seated within a different hole 32. The positioning pin, the spaced holes 32, and the tension spring thus serve as a cooperating locking arrangement.

The extension member 30 has at its inner end an annular disk 38, which is designed to slidably engage within the tubular member 28 and against the interior surface 40 of the tubular member. The annular disk thus serves also to maintain the inner end of the extension member 30 centered with respect to the tubular member 28 in order that the extension member may be freely extended or retracted when released from the positioning pin 34.

Figure 4:
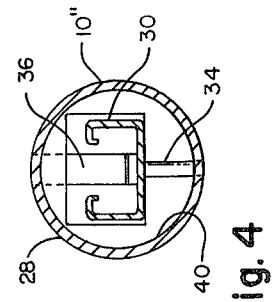
FIG. 4 is a cross-sectional view taken along line 4—4 of FIG. 3.

In reference to FIG. 4 and as well to FIG. 3, it will be noted that the tension spring 36 is connected at its one end to the tubular member 28, and that a portion of its free end engages against the extension member 30 to urge the latter toward the positioning pin 34. The extension member 30 may have a base plate 42 suitably fixed to its outer end and to which a threaded bolt 44 may be attached for subsequent connection to a standard chuck as illustrated in FIG. 1.

OPERATION

Figure 5:
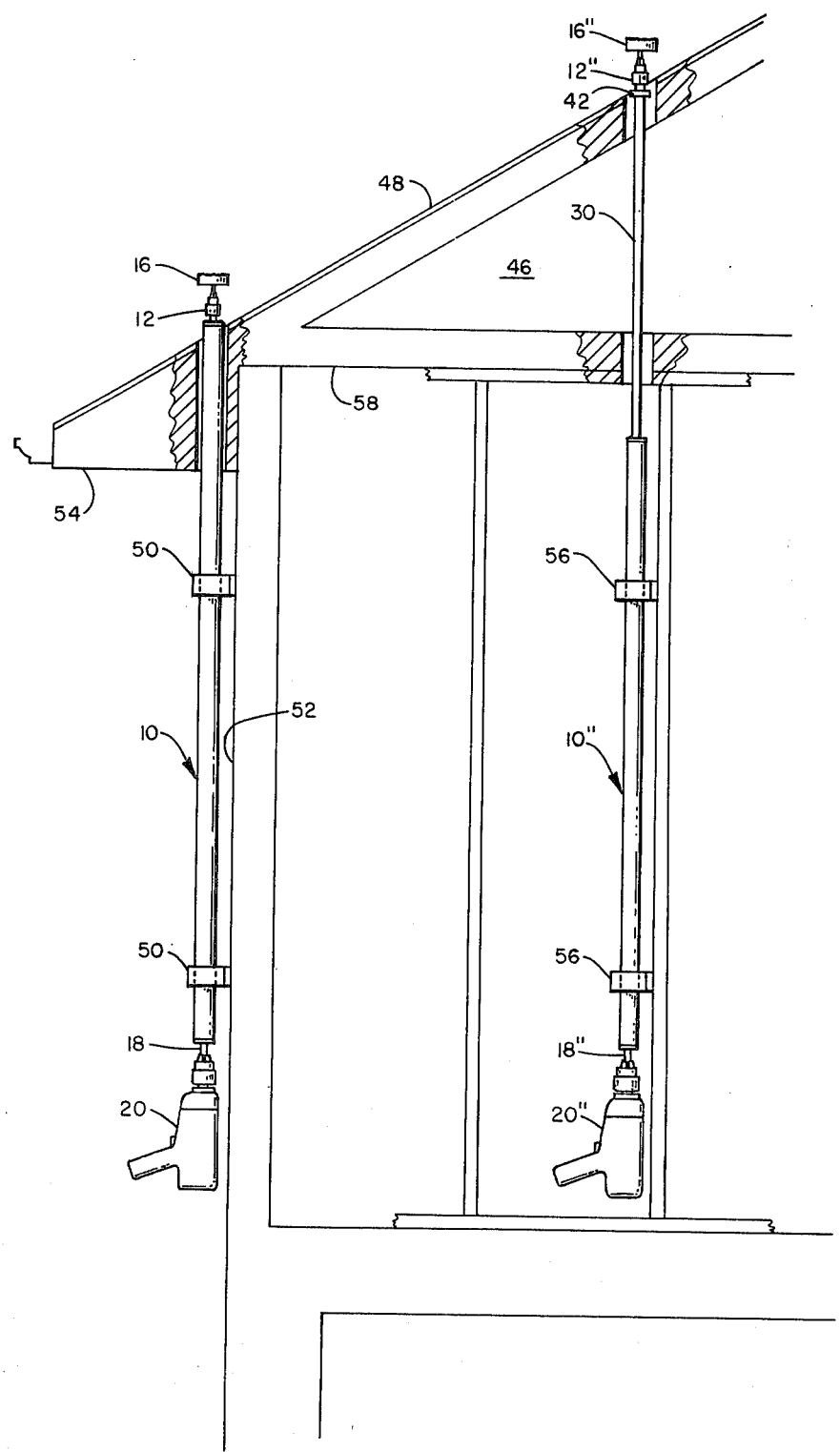
FIG. 5 illustrates a typical sloped house roof partly broken away and in cross-section and two examples how the portable handheld rotatable column may be temporarily clamped by conduit clamps or the like so as to form perfectly aligned holes through a soffit and the roof above, or through a ceiling and the roof above.

In reference to FIG. 5, the operation of the portable, handheld rotatable column will now be described. A house 46, for example, having a sloped roof 48 is shown. In preparation for the subsequent installation of an electrical conduit (not shown), an electrician will secure two or more conduit clamps 50 to the wall 52 that will serve to hold the electrical conduit in place when installed later. He will then position the portable handheld rotatable cylindrical column 10 in place within the conduit clamps, then slidably move the annular spacing collars 22 to the location of the fixed conduit clamps, and finally temporarily secure the conduit clamps about the annular spacing collars. A hole saw 16 of suitable diameter and depth (6" depth, for example) will already be in position at the upper end of the rotatable cylindrical column. He will connect the electrical drill 20 to the lower end of the rotatable cylindrical column and proceed to move the rotatable cylindrical column upwardly relative to the temporarily clamped annular spacing collars as the hole saw is rotated and makes holes through the underside of the horizontally extending soffit 54 and the underside of the sloped roof 48. The resulting formed holes will thus be in straight line alignment with each other and will be of a size to closely conform to the particular diameter of electrical conduit that will subsequently be installed and secured by the conduit clamps 50. This whole operation will take only a matter of minutes to accomplish, as compared to previous typical procedures normally followed by electricians. The utility meter base (not shown) will usually be installed about 5 feet from the ground so that it will be at eye level for reading purposes.

A plumber in preparing for the installation of a soil stack or vent pipe (not shown) will follow a nearly similar procedure as the electrician. Perhaps he will use perforated iron strapping 56 or the like, which will later serve to hold the soil stack or vent pipe (not shown) firmly in place, and then temporarily clamp the portable handheld rotatable cylindrical column 10" (i.e., the extendable one of FIGS. 3 and 4) in place by the iron strapping. He then moves the rotatable cylindrical column upwardly relative to the temporarily clamped annular spacing collars as the hole saw at the upper end thereof is rotated and makes holes through the ceiling 58 and the sloped roof 48. The diameter of the hole saw will be of such size as to form holes suitable to closely accommodate the aforementioned soil stack or vent pipe (not shown).

A builder may make use of the portable handheld rotatable cylindrical column 10 in nearly a similar manner in preparation for chimney pipes (not shown) and the like or perhaps to merely form aligned holes through firestops between wall studs, or through ceilings.

It will be obvious, of course, that the diameter of the portable, handheld device or rotatable cylindrical column as well as the length may be varied in the construction of the column, as well as the diameter and size of the annular spacing collars. Electrical conduits, which may be made from aluminum, steel, or PVC (polyvinyl chloride) pipe may vary from one and one-fourth to four inches or larger in outer diameter. Vent pipes or soil stacks may also vary in outer diameter, and in material.

The invention has thus been described in detail with particular reference to preferred embodiments thereof, but it will be understood that variations and modifications can be effected within the spirit and scope of the invention.

I claim:

1. A portable, handheld device comprising a rotatable cylindrical column of predetermined length for supporting at one end a hole saw or the like, for being driven in rotation at the other end by a drive means, and for being temporarily and releasably secured at two or more locations along its length by conduit clamps or the like which are fastened to a building wall or house wall in spaced predetermined alignment;

said rotatable cylindrical column having at said one end means for receiving and being connected to said hole saw or the like, having at said other end means for being drivably engaged by said drive means, and having two or more annular spacing collars encircling the outer surface of said rotatable column in close slidable and rotatable relation; said annular spacing collars being slidably adjustably spaced along the length of said rotatable column for positioning at said two or more locations, and adapted to be temporarily clamped at said locations by said conduit clamps or the like; and said rotatable cylindrical column also comprising a tubular member having therewithin an extension member adapted to be slidably extended from and relative to said tubular member to different predetermined lengths, and said extension member and said tubular member having cooperating locking means adapted to lock said extension member to said tubular member at said extended different predetermined lengths, said extension member having at its free end said means for receiving and being connected to said hole saw or the like.

2. A rotatable cylindrical column as defined in claim 1 wherein said annular spacing collars have a predetermined outer diameter and thereby are adapted in cooperation with said conduit clamps or the like to space said rotatable cylindrical column a predetermined distance from said building wall or house wall.

3. A rotatable cylindrical column as defined in claim 1 wherein each of said annular spacing collars has a pair of spaced radially extending annular flanges adapted to receive therebetween one of said conduit clamps or the like in temporarily clamped relation.

4. A rotatable cylindrical column as defined in claim 1, said cooperating locking means including a positioning pin connected to said tubular member, and wherein said extension member defines in its surface along its length a series of spaced holes within one of which said positioning pin is adapted to be engaged, and means is provided for urging said extension member toward said positioning pin to retain said positioning pin in said one of said series of spaced holes.

5. A rotatable cylindrical column as defined in claim 1 wherein said extension member has at its inner end a guide means adapted to space said inner end from said tubular member and to slidably engage within said tubular member and against the interior surface of said tubular member.

6. A rotatable cylindrical column as defined in claim 5 wherein said guide means at the inner end of said extension member comprises an annular disk.

7. A rotatable cylindrical column as defined in claim 4 wherein said means provided for urging said extension member comprises a tension spring connected at its one end to said tubular member and having a portion of its free end engaging against said extension member.

* * * * *